United States Patent [19]
Horstein et al.

[11] Patent Number: 5,619,209
[45] Date of Patent: Apr. 8, 1997

[54] USER PAGING FOR MOBILE SATELLITE COMMUNICATIONS

[75] Inventors: Michael Horstein, Los Angeles; Hau H. Ho, Huntington Beach, both of Calif.

[73] Assignee: TRW Inc., Redondo Beach, Calif.

[21] Appl. No.: 181,932

[22] Filed: Jan. 14, 1994

[51] Int. Cl.⁶ ................................................. H04B 7/185
[52] U.S. Cl. ........................ 342/352; 455/13.1; 455/34.1
[58] Field of Search ........................ 342/352; 455/13.1, 455/34.1

[56]      References Cited

U.S. PATENT DOCUMENTS 5,483,664   1/1996   Moritz et al. ........................... 455/13.1

FOREIGN PATENT DOCUMENTS

0421698A2   4/1991   European Pat. Off. .
0562374A1   9/1993   European Pat. Off. .

*Primary Examiner*—Theodore M. Blum
*Attorney, Agent, or Firm*—Michael S. Yatsko

[57]              ABSTRACT

A method of initiating communication between a ground station and a mobile handset through a satellite beam includes the steps of transmitting a forward signal indicative of a fixed geographic area covered by each of a plurality of satellites on at least a periodic basis. The location of said mobile handset is registered by storing at least one variable geographic value associated with said forward control signal at said mobile handset. A reverse signal is transmitted from said mobile handset to said ground station which is indicative of a geographic area where said mobile handset was located during registration. At least one variable geographic value associated with said reverse signal is stored in a database accessible to said ground station. The mobile handset determines whether a currently transmitted forward signal matches said variable geographic value stored. If a match is not found, the current location of said mobile handset is re-registered. The ground station determines which of said satellite beams should initiate a call signal to said mobile handset based upon said variable geographic value stored in said database for said mobile handset.

42 Claims, 4 Drawing Sheets

USER PAGING FOR MOBILE SATELLITE COMMUNICATIONS

BACKGROUND OF THE INVENTION

1. Technical Field

This invention relates to mobile satellite communications systems and, more particularly, to a mobile handset tracking and paging system for a mobile communications system in which the mobile handsets communicate directly with sub-geosynchronous satellites.

2. Discussion

Geosynchronous satellite constellations are less than ideal for use in mobile communications systems in which mobile handsets communicate directly with the orbiting satellites. Launching the satellites into geosynchronous orbit is more costly than lower orbits. Mobile handset transmitter power requirements become greater with increasing orbital distances from the earth. Transmission delays are prohibitively long, especially when the mobile handset communicates with another mobile handset, requiring transmission to geosynchronous orbit and back twice.

Proposed mobile satellite communications systems include mobile handsets which communicate directly with a sub-geosynchronous satellite constellation including a plurality of satellites. Such sub-geosynchronous satellites have lower launch costs, relatively low-power transmitters, and acceptable transmission delays. Each satellite handles a coverage region and divides the coverage region into adjacent subregions. The coverage region of one satellite slightly overlaps the coverage region of another satellite such that earth landmasses are completely covered by the sub-geosynchronous satellite constellation. Each satellite includes antennas which can generate multiple focused beams which may slightly overlap to handle the coverage region of the satellite. If the satellite is orbiting at sub-geosynchronous altitudes, areas covered by each satellite are changing, in contrast with geosynchronous satellite constellations in which coverage regions remain relatively fixed. In addition, mobile users are also changing position with time.

When a first fixed or mobile handset user wishes to initiate a call with a second mobile handset user, the mobile satellite communications system must page the second mobile handset using individual focused beams covering every subregion in which the second mobile handset user might be located. If the mobile communications system is ultimately to be global in scope, it must be assumed that the second mobile handset user might potentially be located anywhere on the earth. Accordingly, it may be possible that more than one satellite would need to be used to page a mobile user.

Paging the second mobile handset user with all of the individual focused beams for one or more satellites in the sub-geosynchronous satellite constellation would be extremely wasteful of both satellite power and bandwidth. Even in a more restricted mobile communications systems, paging the mobile user with most or all of the individual focused beams covering a large region, such as a country or state, would similarly be wasteful of both satellite power and bandwidth. Requiring the mobile user to transmit a signal to a satellite on a periodic basis to allow the communication system to readily locate the mobile handset is also wasteful. As battery-powered mobile handsets are quickly becoming the cellular phone of choice, unnecessary transmissions could substantially reduce available power which is needed by the user for normal telephone communication.

Therefore, a system which can track the mobile user with sufficient accuracy to reduce the number of individual focused beams used to page the mobile user, and consequently reducing bandwidth allocated to paging, is desirable.

SUMMARY OF THE INVENTION

A method of initiating communication between a ground station and a mobile handset through a satellite beam includes the steps of transmitting a forward signal indicative of a fixed geographic area covered by each of a plurality of satellite beams on at least a periodic basis. The location of said mobile handset is registered by storing at least one variable geographic value associated with said forward control signal at said mobile handset. A reverse signal is transmitted from said mobile handset to said ground station which is indicative of a geographic area where said mobile handset was located during registration. At least one variable geographic value associated with said reverse signal is stored in a database accessible to said ground station. Then, said mobile handset determines whether a currently transmitted forward signal matches said variable geographic value stored. If a match is not found, the current location of said mobile handset is re-registered. The ground station determines which of said satellite beams should initiate a call signal to said mobile handset based upon said variable geographic value stored in said database for said mobile handset.

According to one feature of the invention, at least one satellite generating said beams is a sub-geosynchronous satellite.

According to another feature of the invention, a plurality of forward signals are transmitted using said at least one sub-geosynchronous satellite.

In yet another feature of the invention, each of said plurality of forward and reverse signals is associated with an individual focused beam.

In still another feature of the invention, a plurality of grid sections are defined and are fixed with respect to the earth. The forward signals include grid section identification data including grid sections completely or partially covered by said forward signal of said individual focused beam.

In another feature of the invention, the mobile handset selects a strongest individual focused beam received by said mobile handset. The mobile handset stores said grid section identification data of said strongest individual focused beam.

Other objects, features and advantages will be readily apparent.

BRIEF DESCRIPTION OF THE DRAWINGS

The various advantages of the present invention will become apparent to those skilled in the art after studying the following specification and by reference to the drawings in which.

DESCRIPTION OF THE PREFERRED EMBODIMENT

Figure 1:
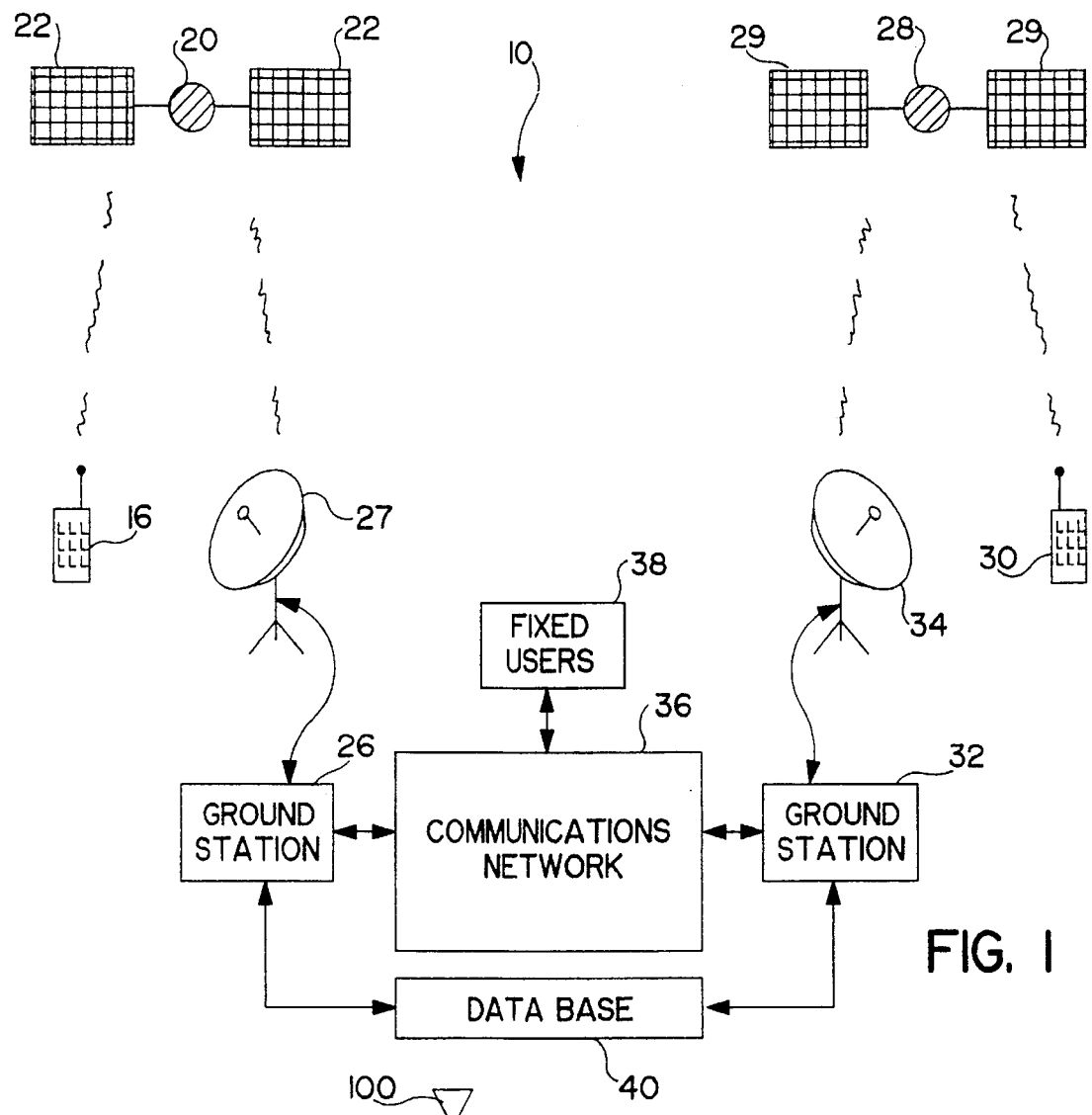
FIG. 1 is a schematic block diagram of a satellite-based mobile communication system incorporating a mobile handset tracking and paging system according to the invention.

In FIG. 1, a satellite-based mobile communications system 10 is shown. Communications system 10 tracks a mobile user to reduce individual focused beams, generated by one or more satellites, used to page the mobile user. Communications system 10 includes at least one mobile handset 16 which communicates with a satellite 20 in a sub-geosynchronous orbit. Satellite 20 includes one or more antennas 22 which relay data between mobile handset 16 and a ground station 26 (including an antenna 27). While the term "mobile handset" is used herein, any mobile telephone is contemplated. Similarly satellite 28 includes one or more antennas 29 which relay data between mobile handset 30 and ground station 32 (including an antenna 34). Ground station 26 is preferably connected to a communications switching network 36 which can connect mobile handset 16 with a plurality of fixed users 38 or a plurality of mobile handsets, such as mobile handset 30. A database 40 stores data required to track and page users of satellite-based mobile communications system 10 as will be described more fully below. It should also be understood that database 40 could reside in a single location, such as switching network 36, or it could be a distributed database as well. Satellites 20 and 28 form part of a multi-satellite sub-geosynchronous communications constellation orbiting the earth. For example, the sub-geosynchronous satellite constellation can be a medium orbit constellation disclosed in "Cellular Telephone Satellite System," European Patent Application No. 92308604.5, filed on Sep. 22, 1992, and hereby incorporated by reference.

Referring to FIG. 2, one or more satellites generate a beam footprint including a plurality of individual focused beams 54. Each individual focused beam 54 includes order wire channels, which coordinate communication system operations, in addition to voice channels carrying two-way voice data. Order wire channels include forward control channels and reverse access channels. Forward control channels include communications from a ground station to a mobile handset, such as information from ground station 26 relating to access to the communications system by handset 16.

Reverse access channels include communications from a mobile handset to a ground station, such as responses to call requests. When a user initiates communications with mobile handset 16, handset 16 selects the strongest forward control channel received as is consistent with current cellular communications systems. As such, satellite-based mobile communications system 10 can be easily implemented to operate in conjunction with or as a replacement for the existing mobile cellular communications system.

Figure 2A:
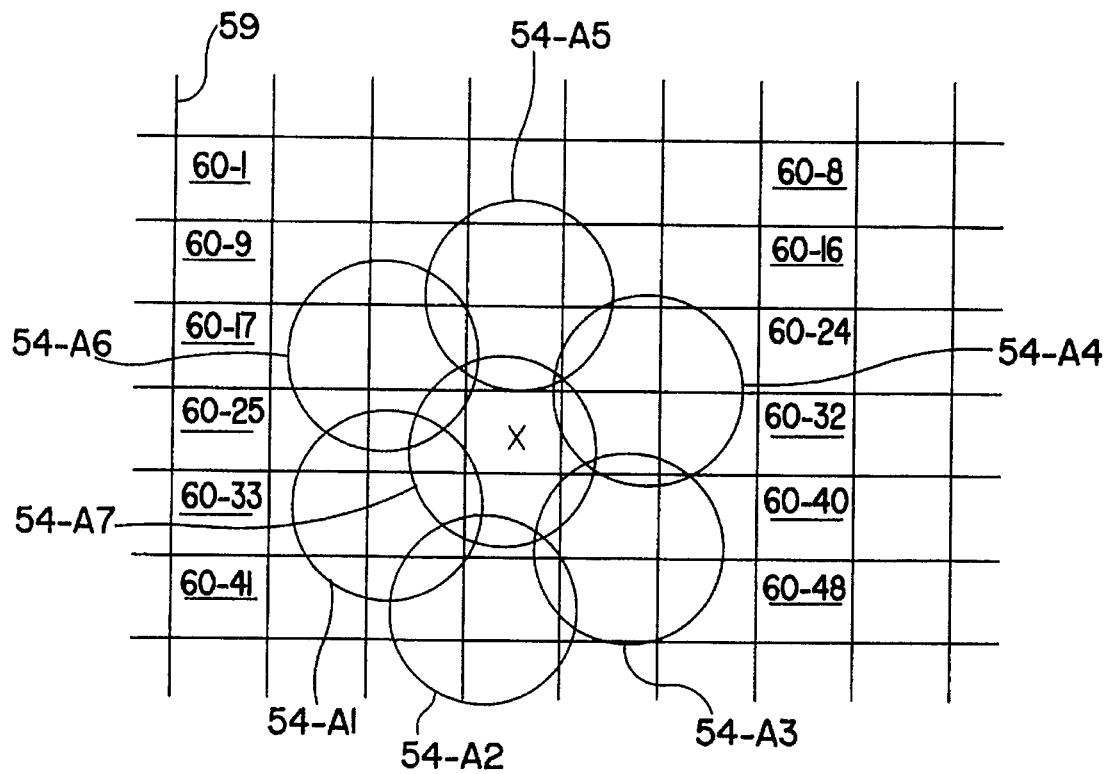
FIGS. 2a, 2b, 2c and 2d illustrate a grid including a plurality of grid sections, fixed with respect to the earth, and a plurality of individual focused beams generated by one or more Sub-geosynchronous satellites.

According to the invention and referring to FIG. 2a, a grid 59 with a plurality of grid sections 60-1, 60-2, . . . , and 60-M is established using geographical coordinates. In other words, grid 59 is fixed with respect to earth. The position of mobile handsets 16 and 30 are tracked relative to the grid sections 60 of fixed grid 59, as will be described more fully below. The grid 59 can cover the entire surface of the earth, landmasses of the earth, or only part of the landmasses of the earth. The forward control channels in each individual beam identify, using unique grid identifications (for example, numbers), all grid sections completely or partially covered by the individual focused beam at the time of transmission. While only seven individual beams are shown (for purposes of clarity) in FIG. 2a, it can be appreciated that fixed grid 59 would be entirely covered by additional individual beams of one or more satellites.

For example, consider the situation where the user of mobile handset 16 initiates a call to one of the plurality of fixed users 38 or to a mobile handset such as mobile handset 30. Mobile handset 16 selects the strongest individual focused beam by sampling forward control channels to identify the strongest received forward control channel. Other methods of identifying the strongest individual focused beam will be readily apparent.

When mobile handset 16 is located at position "X" in FIG. 2a in grid section 60-28, individual focused beams 54-A1, 54-A6, and 54-A7 from one or more satellites could completely or partially cover grid section 62-28. Mobile handset 16 could identify individual focused beam 54-A7 as the strongest received beam. At the time of transmission, individual focused beam 54-A7 completely or partially covers grid sections 60-20, 60-21, 60-27, 60-28, 60-29, 60-35, 60-36, and 60-37. While each individual beam 54 in FIG. 2a completely or partially covers at most nine grid sections, it can be appreciated that additional or fewer grid sections can be covered. The forward control channel for individual focused beam 54-A7 will include grid section identification data identifying each of the partially or completely covered grid sections identified above.

Figure 3:
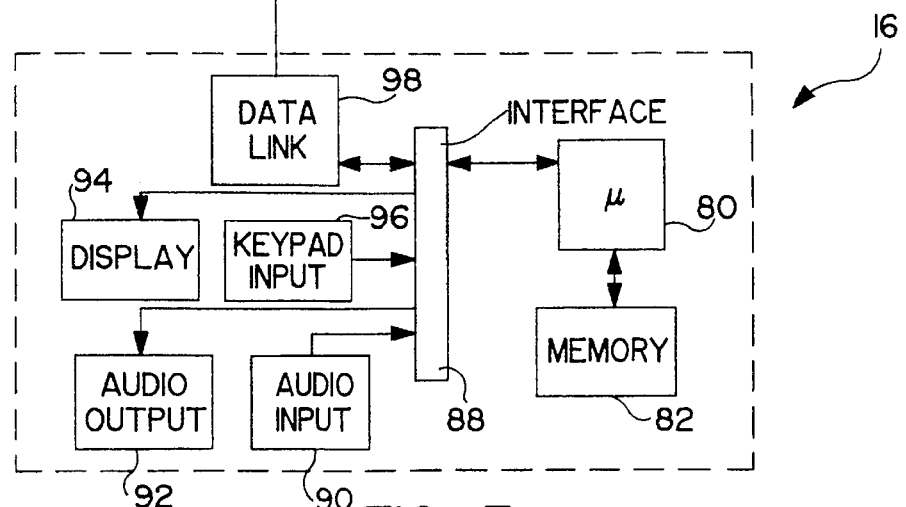
FIG. 3 is a schematic block diagram of a mobile handset.
Figure 4:
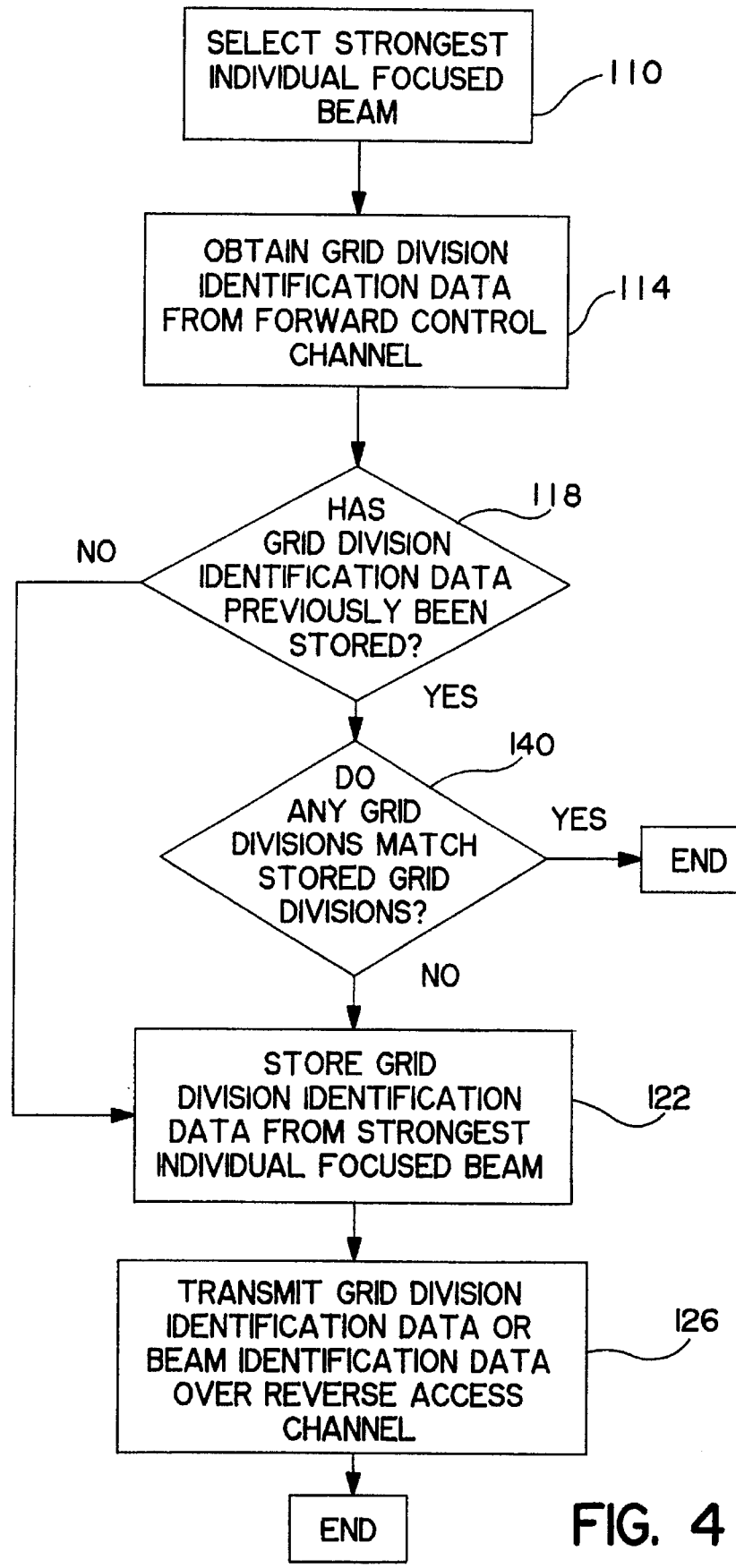
FIG. 4 is a logic diagram of a registration operation performed by the mobile handset tracking and paging system.

FIG. 3 is a block diagram of mobile handset 16 which includes a microprocessor 80, memory 82, an input/output interface 88, an audio input 90, an audio output 92, a display 94, a keypad input 96, a data link device 98 providing transmit and receive functions, and an antenna 100. FIG. 4 is a logic diagram of a registration operation of mobile handset 16. When initially registering, mobile handset 16 selects the strongest received individual focused beam (block 110). Mobile handset 16 will receive and store the grid section identification data transmitted by the forward control channel of the strongest individual focused beam in memory 82 (blocks 114, 118, and 122). The mobile handset 16 will then transmit beam identification data over the reverse access channel to ground station 26 (block 126).

Ground stations 26 and 32 perform conventional modulation and demodulation functions, and other conventional downlink and uplink functions. Ground station 26 receives the beam identification data from mobile handset 16. Ground station 26 stores grid sections corresponding to the beam identification data in the database 40 coupled to ground stations 26 and 32. Since ground station 26 knows the approximate time that mobile handset received the grid section identification data and the beam identification data identifies the satellite, ground station 26 can determine and store the grid section identification data for mobile handset 16. Re-registration of mobile handset 16 is performed only when mobile handset 16 selects the strongest individual focused beam and none of the grid sections identified by the grid section identification data sent on the forward control channel of the selected individual focused beam match any of the grid sections previously stored in memory 82 of mobile handset 16.

Figure 2B:
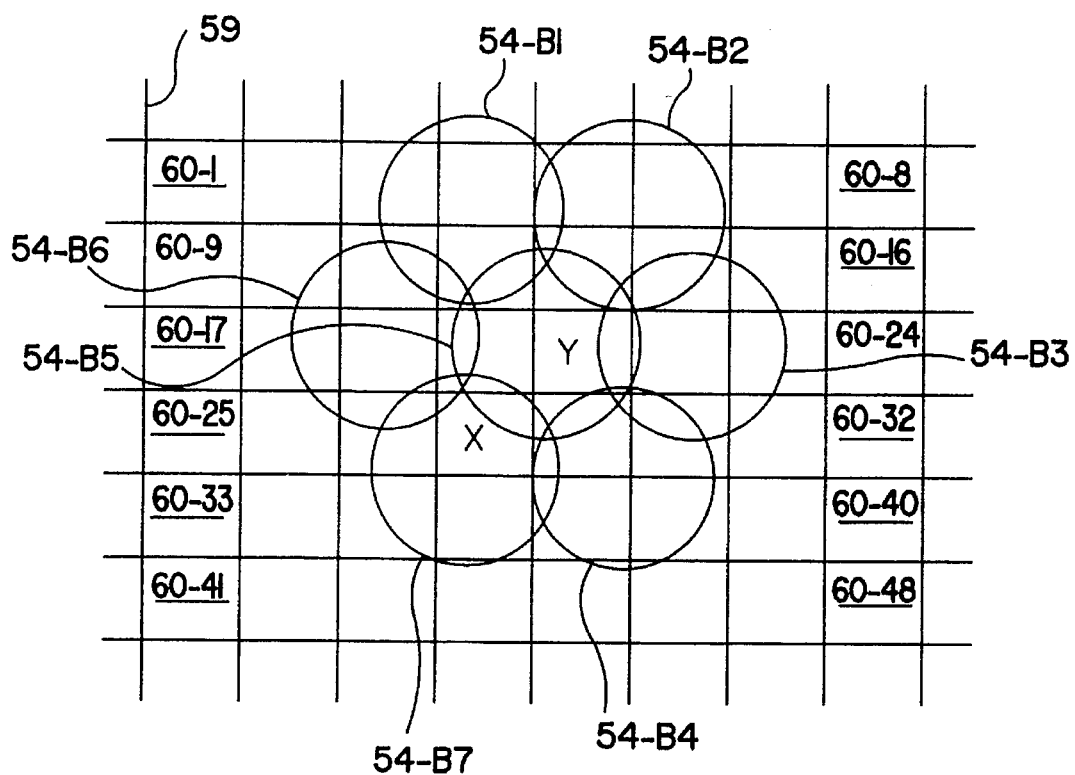
Figure 2C:
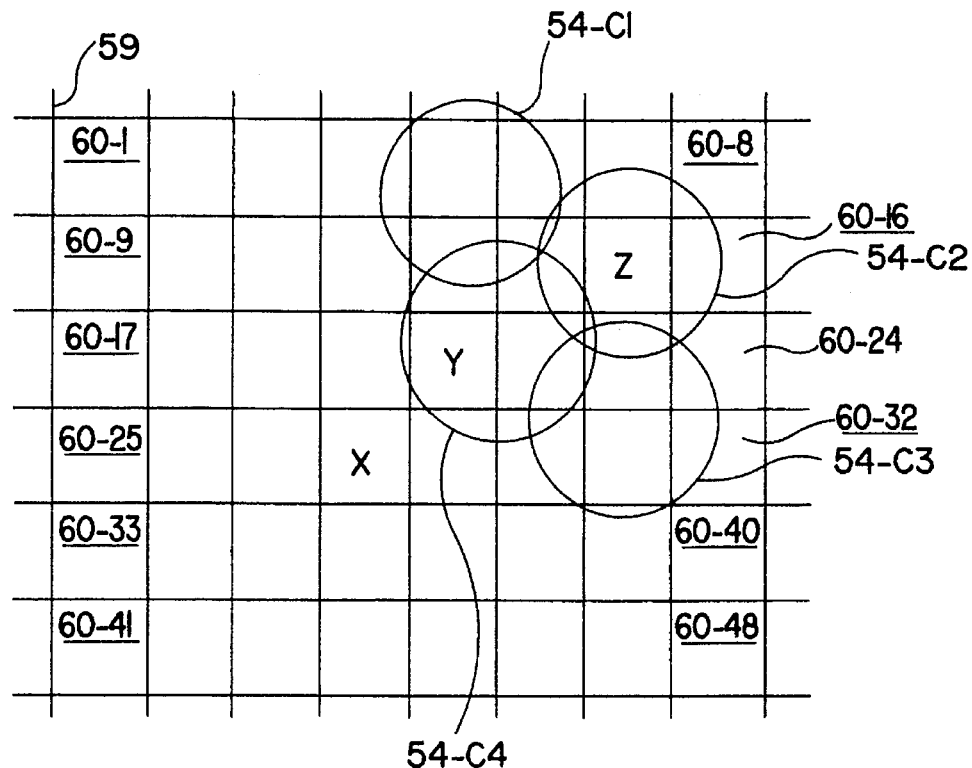
Figure 2D:
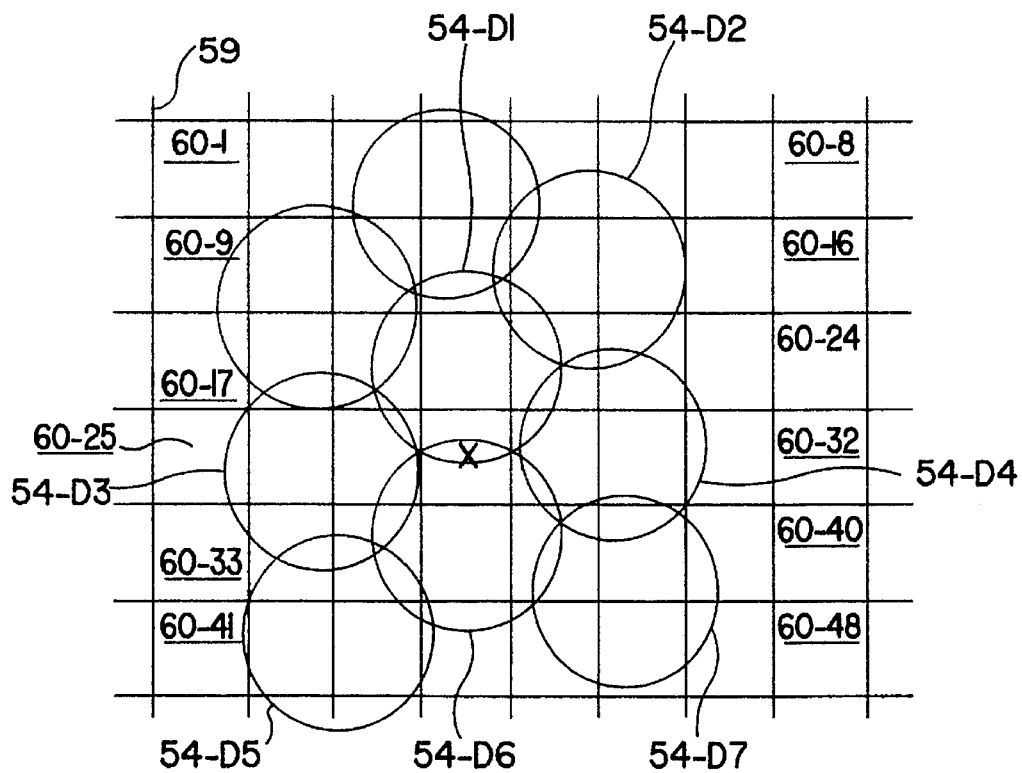

Continuing with the example above and referring to FIG. 2b, some time later the user can transport mobile handset 16 to position "Y" in grid section 60-21. When the user initiates a call request, mobile handset 16 can search for and select individual focused beam 54-B5 as the strongest received beam (block 110). At the time beam 54-B5 was selected by mobile handset 16, beams 54-B3, also completely or partially cover grid section 60-21. The individual focused beams completely or partially covering grid section 60-21 at this time can be generated by one or more satellites. The individual focused beams may or may not be generated by the same satellite which generated beams 54-A1 through 54-A7.

Mobile handset 16 receives the grid section identification data by sampling the forward control channel of the individual focused beam 54-B5 (block 114). Re-registration of mobile handset 16 will not occur since individual focused beam 54-B5 partially or completely covers grid sections 60-20, 60-21, 60-28, and 60-29 which were also completely or partially covered by individual focused beam 54-A7 (block 140). When the grid section data in the forward control channel of individual focused beam 54-B5 is compared with grid sections stored in memory 82, a match occurs and re-registration is not required.

However, if the user subsequently transports mobile handset 16 to position "Z" in grid section 60-15 (FIG. 2c), mobile handset 16 will select individual focused beam 54-C2 as the strongest received beam (block 110). The individual focused beams 54-C1 through 54-C4 may or may not be generated by the same satellite which generated beams 54-A1 through 54-A6 or 54-B1 through 54-B6. Mobile handset 16 samples the forward control channel of the strongest received beam (block 114) and compares the grid section identification data contained therein with the grid section identification stored in memory 82 (block 118). None of the grid sections previously stored in memory 82 of mobile handset 16 match the grid sections completely or partially covered by selected beam 54-C2 (block 140). Therefore, mobile handset 16 re-registers by storing (block 122) all of the grid sections contained in the grid section identification data on the forward control channel of the strongest received beam 54-C2 (including grid sections 60-6, 60-7, 60-8, 60-14, 60-15, 60-16, 60-22, 60-23, and 60-24). The previously stored grid section identification data is deleted from memory 82. Then mobile handset 16 transmits the beam identification data on the reverse access channel to ground station 26 which stores the grid section identification data in paging database 114 for mobile handset 16. It should also be appreciated that mobile handset 16 could also transmit grid section identification data instead of the beam identification data. However, such grid section identification data would require more bandwidth and transmission power than shorter-length beam identification data.

Ground station 26 knows the approximate time that mobile handset 16 selected the strongest individual focused beam 54-C2, and received the beam identification data identifying the strongest individual focused beam 54-C2. Database 40 or ground stations 26 and 32 could include a look-up table storing grid section numbers covered by each individual focused beam at a given time. Using the look-up tables or database 40, in addition to the beam identification data, ground station 26 could determine grid sections completely or partially covered at the time of selection of the strongest beam and could then determine and store grid sections for mobile handset 16 in database 40.

When mobile handset 16 is not initiating a call request or completing a call, mobile handset 16 can be placed in a standby mode waiting for incoming calls. When ground station 26 needs to complete a call to mobile handset 16, ground station 26 initiates paging to locate mobile handset 16.

Ground station 26 initiates a paging message for mobile handset 16 over forward control channels of every individual focused beam which completely or partially covers a grid section identified by the grid section identification data stored in database 40. In other words, in the example registration described with respect to FIG. 2a, mobile handset 16 initially registered grid sections 60-20, 60-21, 60-27, 60-28, 60-29, 60-35, 60-36, and 60-37. Ground station 26 pages mobile handset 16 using individual focused beams completely or partially covering each of the registered grid sections 60-20, 60-21, 60-27, 60-28, 60-29, 60-35, 60-36, and 60-37. Therefore, referring to FIG. 2d, and assuming the re-registration described in conjunction with FIG. 2c has not occurred (in other words, mobile handset has not left grid sections 60-20, 60-21, 60-27, 60-28, 60-29, 60-35, 60-36 and 60-37), ground station pages mobile handset on the forward control channels of individual focused beams 54-D1 through 54-D7. Accordingly, even if the mobile handset 16 does not move from position "X" in grid section 60-28 of FIG. 2a, different satellite beams will pass over the initially registered grid sections, and it will be these subsequently arriving beams which will be used to page the mobile handset 16.

While FIGS. 2a through 2d illustrate individual focused beams 54 as circular, one skilled in the art can appreciate that the shape of individual focused beams 54 on a grid section 60 will be circular when the satellite is directly above the grid section 64. Otherwise, individual focused beams 54 are ellipses and other distorted circular shapes. Dimensions of grid sections can be selected by optimizing two competing concerns. Larger grid size increases the number of beams over which the paging message must be transmitted. Smaller grid sizes increase the length of the paging message because of the large number of grid sections covered by each beam. Different grid shapes can also be used.

As can be appreciated from the foregoing, satellite-based mobile communications system 10 significantly reduces the number of forward control channels (each associated with an individual focused beam) used to transmit the paging message required to page a mobile handset user. Satellite-based mobile communications system 10 does not require determination of user position based upon properties of signals transmitted by either the satellites or by the mobile handset. Satellite-based communications system significantly reduces satellite power and bandwidth requirements without requiring determination of user position precisely.

The various advantages of the present invention will become apparent to those skilled in the art after a study of the foregoing specification and following claims.

What is claimed is:

1. A method of initiating communication between a ground station and a mobile handset through a satellite beam, comprising the steps of:

(a) transmitting a forward signal indicative of a fixed geographic area as at least one of a plurality of coverage satellite beams passes over said fixed geographic area on at least a periodic basis;

(b) registering the location of said mobile handset by storing, at said mobile handset, at least one variable geographic value, indicative of at least a portion of said fixed geographic area, based on said forward control signal received by said mobile handset, transmitting a reverse signal from said mobile handset to said ground station which is indicative of a portion of said fixed geographic area where said mobile handset was located during registration, and storing at least one variable geographic value associated with said reverse signal in a database accessible to said ground station;

(c) determining at said mobile handset whether a currently transmitted forward signal matches said variable geographic value stored, and if a match is not found, then repeating said step of registering to re-register the current location of said mobile handset; and (d) determining which of said satellites beams should initiate a call signal from said ground station to said mobile handset based upon said variable geographic value stored in said database for said mobile handset.

2. The method of initiating communication of claim 1 wherein at least one satellite generating said beams is a sub-geosynchronous satellite.

3. The method of initiating communication of claim 2 further comprising the step of:

(e) transmitting, using said at least one sub-geosynchronous satellite, a plurality of forward signals.

4. The method of initiating communication of claim 3 wherein each of said plurality of forward and reverse signals is associated with an individual focused beam.

5. The method of initiating communication of claim 1 further comprising the step of:

(e) defining a plurality of grid sections fixed with respect to the earth, said grid sections defining said fixed geographic area.

6. The method of initiating communication of claim 5 wherein said forward signals include grid section identification data identifying grid sections completely or partially covered by said forward signal of said individual focused beam.

7. The method of initiating communication of claim 1 further comprising the steps of:

(e) selecting a strongest individual focused beam received by said mobile handset; and (f) storing a grid section identification data of said strongest individual focused beam.

8. The method of initiating communication of claim 1 wherein step (c) is performed periodically.

9. The method of initiating communication of claim 1 wherein step (c) is performed when said mobile handset initiates a call.

10. The method of initiating communication of claim 7 wherein said reverse signal generated in step (b) includes beam identification data identifying the selected individual focused beam.

11. The method of initiating communication of claim 7 wherein said reverse signal generated in step (b) includes grid section identification data identifying the selected individual focused beam.

12. The method of initiating communication of claim 7 wherein said match in step (c) occurs if at least one grid section stored in said mobile handset matches a grid section in said grid section identification data of said selected forward signal.

13. The method of initiating communication of claim 12 wherein said call signal is transmitted in said forward signals of each individual focused beam completely or partially covering grid sections stored in said database for said mobile handset.

14. The method of initiating communication of claim 1 wherein said forward signal contains said at least one variable geographic value uniquely identifying said portion of said fixed geographic area.

15. The method of initiating communication of claim 1, wherein said reverse signal contains a signal uniquely identifying said at least one variable geographic value obtained from said forward control signal.

16. The method of initiating communication of claim 1, wherein said portion of said fixed geographic area remains stationary with respect to the earth throughout motion of said satellite beams.

17. A method of initiating communication between a ground station and a mobile handset through at least one sub-geosynchronous satellite, comprising the steps of:

(a) defining a plurality of grid sections which are fixed with respect to the earth;

(b) transmitting a plurality of individual focused beams, each with at least one forward channel, at said fixed grid sections, said individual focused beams passing over, and moving relative to, said grid sections;

(c) transmitting grid section identification data related to grid sections completely or partially covered by an individual focused beam using a corresponding one of said forward channels;

(d) sampling a forward channel of a selected one of said individual focused beams using said mobile handset to obtain grid section identification data; and (e) registering the location of said mobile handset by storing said grid section identification data, and transmitting, using said mobile handset, at least one of said grid section identification data and beam identification data on a reverse channel of said selected individual focused beam.

18. The method of initiating communication of claim 17 further comprising the steps of:

(f) storing said grid section identification data of said mobile handset in a database accessible to said ground station.

19. The method of initiating communication of claim 18 further comprising the steps of:

(f) determining, at said mobile handset, whether grid section identification data of a selected individual focused beam matches grid section identification data stored by said mobile handset.

20. The method of initiating communication of claim 19 wherein said match occurs if at least one grid section stored by said mobile handset matches at least one grid section in said grid section identification of said selected individual focused beam.

21. The method of initiating communication of claim 19 wherein said mobile handset performs step (f) periodically.

22. The method of initiating communication of claim 19 wherein said mobile handset performs step (f) when said mobile handset initiates a call.

23. The method of initiating communication of claim 19 further comprising the steps of:

(g) replacing said stored grid section identification data with said grid section identification data of said selected individual focused beam if said match is not found.

24. The method of initiating communication of claim 23 further comprising the steps of:

(h) determining which individual focused beams should include a paging signal for said mobile handset based upon said grid section identification data stored by said database.

25. The method of initiating communication of claim 24 wherein said paging signal is included in said forward channels of each individual focused beam completely or partially covering grid sections stored in said grid section identification data in said database for said mobile handset.

26. The method of initiating communication of claim 17, wherein said plurality of grid sections remain stationary with respect to the earth throughout relative motion of said individual focused beams.

27. A system for initiating communication between a ground station and a mobile handset through a satellite comprising:

a mobile handset;

a ground station; and at least one satellite generating a plurality of individual focused beams for relaying data between said mobile handset and ground station, said mobile handset including:

transmitting and receiving means for transmitting and receiving data from said ground station via said at least one satellite, sampling means, connection to said mobile handset transmitting and receiving means, for obtaining grid division identification data related to grid divisions from a forward control channel of a selected individual focused beam of a satellite, said grid divisions remaining fixed with respect to the earth as said selected individual focused beam passes over said grid division, comparing means, connected to said sampling means, for comparing said grid division identification data with stored grid division identification data to identify a match, and storing means, connected to said sampling means and said comparing means, for replacing said stored grid division identification data with said grid division identification data from said strongest individual focused beam if said match does not occur.

28. The system of claim 1 wherein said handset further includes identifying means, connected to said transmitting and receiving means, for identifying a strongest individual focused beam of said at least one satellite as said selected individual focused beam.

29. The system of claim 28 wherein said match occurs if at least one grid division of said stored grid division identification data matches with at least one grid division in said grid division identification data transmitted in said forward control channel of said strongest individual focused beam.

30. The system of claim 29 wherein said mobile handset transmitting and receiving means transmits said grid division identification data on a reverse access channel of said strongest individual focused beam if said match does not occur.

31. The system of claim 30 wherein said mobile handset includes trigger means for triggering said identifying means to identify said strongest individual focused beams.

32. The system of claim 30 wherein said trigger means triggers said identifying means when a user initiates a call request using said mobile handset.

33. The system of claim 30 wherein said trigger means includes timing means for timing a tracking period, wherein said timing means periodically actuates said trigger means every tracking period.

34. The system of claim 29 wherein said mobile handset transmitting and receiving means transmits beam identification data on a reverse access channel of said strongest individual focused beam if said match does not occur.

35. The system of claim 27 wherein said at least one satellite includes transmitting and receiving means for relaying individual focused beams to and from at least one mobile handset and at least one ground station.

36. The system of claim 35 wherein said ground station includes a transmitting and receiving means for transmitting and receiving data to and from said satellite, wherein said transmitting and receiving means is connected to a communications network.

37. The system of claim 36 wherein said ground station is connected to a paging database.

38. The system of claim 37 wherein said satellite transmitting and receiving means receives said beam identification data on said reverse access channel from said mobile handset and transmits said beam identification data to said ground station.

39. The system of claim 38 wherein said ground station stores grid division identification data corresponding to said beam identification data for said mobile handset in said paging database.

40. The system of claim 39 wherein said paging database, connected to said ground station, includes storing means for storing grid division coverage data for each satellite.

41. The system of claim 40 wherein said ground station pages said mobile handset by including a paging message in said individual focused beams which completely or partially cover said grid divisions stored in said paging database for said mobile handset using said grid division coverage data.

42. The system of claim 27, wherein said sampling means obtains grid division identification data identifying grid divisions which remain stationary with respect to the earth throughout relative motion of said selected individual focused beam.

* * * * *